(12) United States Patent
Ozeki

(10) Patent No.: US 7,835,081 B2
(45) Date of Patent: Nov. 16, 2010

(54) DIFFRACTIVE OPTICAL ELEMENT AND BIDIRECTIONAL OPTICAL COMMUNICATION MODULE USING THE SAME

(75) Inventor: Yukihiro Ozeki, Fujisawa (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 12/275,154

(22) Filed: Nov. 20, 2008

(65) Prior Publication Data
US 2009/0103182 A1    Apr. 23, 2009

Related U.S. Application Data

(63) Continuation of application No. 11/365,987, filed on Mar. 1, 2006, now abandoned.

(30) Foreign Application Priority Data

Mar. 9, 2005    (JP) .............................. 2005-065684

(51) Int. Cl.
*G02B 5/18* (2006.01)
*H04J 14/02* (2006.01)

(52) U.S. Cl. .................... 359/574; 359/569; 398/84; 398/87

(58) Field of Classification Search .................. 359/588, 359/569, 574
See application file for complete search history.

(56) References Cited

U.S. PATENT DOCUMENTS

| | | | | |
|---|---|---|---|---|
| 4,405,405 A | * | 9/1983 | Fujii et al. | ...................... 216/2 |
| 5,116,461 A | | 5/1992 | Lebby et al. | |
| 5,555,334 A | | 9/1996 | Ohnishi et al. | |
| 6,545,808 B1 | * | 4/2003 | Ehbets et al. | ............... 359/566 |
| 2004/0013076 A1 | | 1/2004 | Funato et al. | |

FOREIGN PATENT DOCUMENTS

| | | |
|---|---|---|
| JP | 7-104154 A | 4/1995 |
| JP | 7-261054 A | 10/1995 |
| JP | 2003-344715 A | 12/2003 |

\* cited by examiner

*Primary Examiner*—Stephone B Allen
*Assistant Examiner*—Jade R Chwasz
(74) *Attorney, Agent, or Firm*—Holtz, Holtz, Goodman & Chick, PC

(57) ABSTRACT

A diffractive optical element has a diffraction grating which multiplexes light beams of different wavelengths, and the diffraction grating has a binary structure in which the diffraction surface top part and the diffraction surface bottom part repeat a concave and convex shape through a rising surface part along an optical axis direction P. The diffraction surface top part and the diffraction surface bottom part are inclined to the rising surface part. By this diffractive optical element, the diffraction angle of the light beam is maintained, and the diffraction efficiency of the light beam can be improved. By using this diffractive optical element in an optical communication module, while the separation angle of the light beam of the different wavelength is maintained, the signal receiving performance is increased.

17 Claims, 7 Drawing Sheets

DIFFRACTIVE OPTICAL ELEMENT AND BIDIRECTIONAL OPTICAL COMMUNICATION MODULE USING THE SAME

CROSS-REFERENCE TO RELATED APPLICATION

The present application is a Continuation application of U.S. application Ser. No. 11/365,987 filed Mar. 1, 2006, now abandoned which is incorporated herein by reference.

BACKGROUND OF THE INVENTION

1. Field of the Invention

The present invention relates to a diffractive optical element having the diffraction grating of the concave and convex shape and an optical communication module using this diffractive optical element.

2. Description of the Related Art

Figure 7:
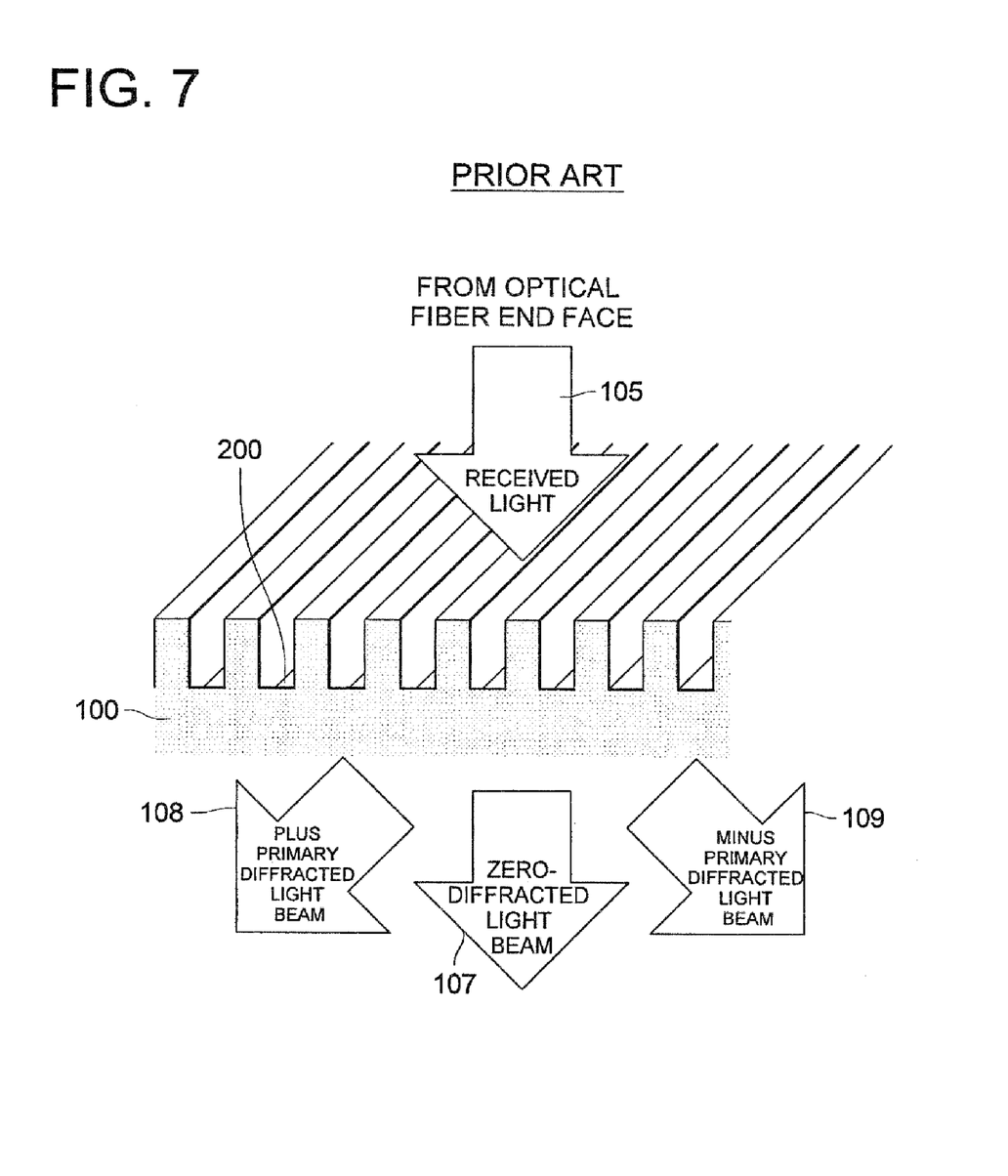
FIG. 7 is a perspective view showing an example of the diffraction groove, disclosed in the U.S. Pat. No. 5,555,334.

In an optical communication system by an optical transmission path such as an optical fiber, a plurality of optical signals whose wavelengths are different by WDM (Wavelength Division Multiplexing) are simultaneously transmitted by the optical fiber, and for the signal sending receiving terminal, a bidirectional optical transmission module is used. In such a bidirectional optical transmission module, for the purpose that the light beam for signal sending (ascent light beam) from the light emitting element toward the terminal of the optical fiber, and the light beam for signal receiving (decent light beam) from the terminal of the optical fiber toward the light receiving element are separated, it is commonly known that the diffraction grating is used. For example, in an optical transmission module written in the U.S. Pat. No. 5,555,334 or the following Japanese patent documents 1, 2, the diffraction grating as shown in FIG. 7 is used. FIG. 7 is a perspective view showing an example of the diffraction groove formed in the diffraction grating disclosed in the U.S. Pat. No. 5,555,334, or in the Japanese patent documents 1, 2.

As shown in FIG. 7, in a diffraction grating 100, a grating groove 200 of a rectangular sectional shape is formed. When the light beam is incident on the diffraction grating 100, the diffraction grating 100 diffracts the light beam, and several diffracted light beams are generated. To the receiving light beam (descent light beam) 105 which is transmitted in the optical fiber, and projected from the optical fiber end surface, the diffraction action is given by the diffraction grating 100, and 0-order diffracted light beam 107, +1-order diffracted light beam 108, and −1-order diffracted light beam 109 are generated. In them, +1-order diffracted light beam 108 is bent to the optical axis, separated from the light beam (ascent light beam) for the signal sending, and light-converged on the light-receiving surface of the light-receiving element, and the receiving signal is detected. Hereupon, because −1-order diffracted light beam 109 is bent in the same manner, it may also be made so that the −1-order diffracted light beam 109 is light-converged on the light-receiving surface of the light-receiving element. Further, the light beam (ascent light beam) for signal sending from the light source becomes the transmission light beam (0-order diffracted light beam) which transmitted through the diffraction grating 100, and is light-converged on the end surface of the optical fiber.

Figure 8:
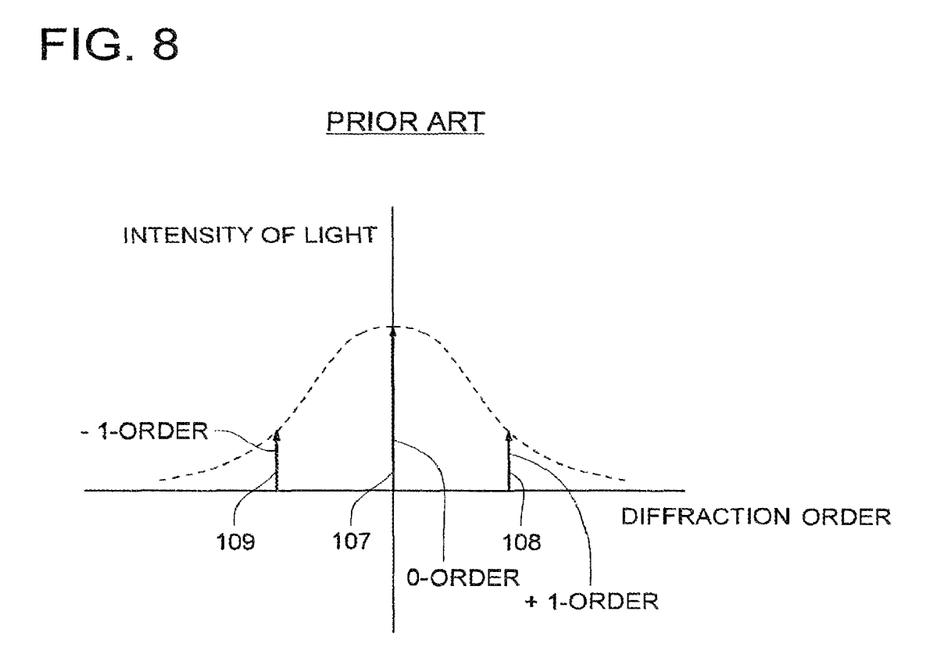
FIG. 8 is a view generally showing each of intensity of lights of the 0-order diffracted light beam, +1-order diffracted light beam and -1-order diffracted light beam.

In FIG. 8, each of intensity of lights of the 0-order diffracted light beam 107, +1-order diffracted light beam 108 and −1-order diffracted light beam 109 in the diffraction grating 100 in FIG. 7 is schematically shown. The intensity of light is maximum in the 0-order diffracted light beam 107, and those of +1-order diffracted light beam 108 and −1-order diffracted light beam 109 are smaller than the intensity of light of the 0-order diffracted light beam 107. Accordingly, because the receiving signal is detected on the light receiving surface of the light receiving element by using the +1-order diffracted light beam 108 (or −1-order diffracted light beam 109) whose light amount is small, the signal receiving accuracy by the receiving signal becomes poor, therefore, the module performance is lowered.

[Japanese Patent Document 1] Tokkaihei No. 07-104154
[Japanese Patent Document 2] Tokkaihei No. 07-261054

SUMMARY OF THE INVENTION

In view of problems of the conventional art as described above, the object of the present invention is to provide a diffractive optical element by which the diffraction angle is maintained, and the diffraction efficiency can be increased, and an optical communication module using this diffractive optical element.

These and other objects are attained by a diffractive optical element or an optical communication module including this diffractive optical element, and the diffractive optical element has the diffraction grating which separates the different wavelengths, and the diffraction grating has a binary structure by which the top part of the diffractive surface and a bottom part of the diffractive surface are repeated in the concave and convex shape through the rising surface part along the optical axis direction, and the top part of the diffractive surface and the bottom part of the diffractive surface are inclined by a predetermined angle to the direction perpendicular to the rising surface part.

According to this diffractive optical element, because when the top part and the bottom part of the diffractive surface of the concave and convex shape are inclined to the direction perpendicular to the rising surface part, the diffracted light beam has the maximum intensity of light, while a predetermined diffraction angle is maintained, the diffraction efficiency can be increased. Further, according to the optical communication module using the diffractive optical element, because the diffractive optical element can increase the diffraction angle and the diffraction efficiency, the efficiency which the optical signal receives is increased, and the optical communication module whose signal receiving performance is high, can be realized.

In the above diffractive optical element, the diffraction grating can be structured so that the incident light beam can transmit it (transmission type). In the case of this transmission type, when the inclination angle to the direction perpendicular to the rising surface part of the diffractive surface top part and the diffractive surface bottom part is within the range of 2° to 7°, preferably 3° to 6°, the diffraction efficiency is further increased.

Further, it is preferable that the height H1 in the optical axis direction of the concave and convex shape is determined so that it satisfies the following expression (1).

$$H1 = \{\lambda_0/(n-1)\} \times K \tag{1}$$

Where, $\lambda_0$: one of the wavelength of the incident light beams, n: refractive index of the material of the diffraction grating, K: 3 or 4.

In the above diffractive optical element, the diffraction grating can be structured so that the incident light beam is reflected (reflection type). Therefore, it is preferable that on the surface side of the diffraction grating, the reflection surface is formed.

In the case of this reflection type, it is preferable that the inclination angle to the direction perpendicular to the rising surface part of the diffraction surface top part and the diffraction surface bottom is in the range of 1° to 3°, and the diffraction efficiency is further increased.

Further, it is preferable that the height H2 in the optical axis direction of the above concave and convex shape is determined so that it satisfies the following expression (2). It is the case where the incident light beam is incident from the opposite side to the surface on which the diffraction grating is formed, and reflected by the diffraction grating.

$$H2=\{\lambda_0/(2\cdot n)\}\times K \quad (2)$$

Where, $\lambda_0$: one of the wavelength of the incident light beams, n: the refractive index of the material of the diffraction grating, K: 3 or 4.

Further, it is preferable that the height H3 in the optical axis direction of the above concave and convex shape is determined so that it satisfies the following expression (3). It is the case where the incident light beam is incident on the surface on which the diffraction grating is formed, and reflected by it.

$$H3=(\lambda_0/2)\times K \quad (3)$$

Where $\lambda_0$: one of the wavelength of the incident light beams, K: 3 or 4.

Further, the above object of the present invention is attained by the bidirectional optical communication module provided with: the light beam emitting element which sends the optical signal to the end of the optical fiber; the light receiving element which receives the optical signal from the end of the optical fiber; the demultiplexing means composed of the diffraction optical element; and in which the demultiplexing means is structured so that the first optical path between the end of the optical fiber and the light emitting element, and the second optical path between the end of the optical fiber and the light receiving element are separated by the different wavelengths of each of optical signals.

According to this bidirectional optical communication module, because the diffraction angle of the diffraction optical element and the diffraction efficiency are large, the signal receiving efficiency of the optical signal can be increased, and the down-sizing of the optical communication module and the improvement of the signal receiving performance can be realized.

In the bidirectional optical communication module, it is preferable that the wavelength $\lambda_0$ of the optical signal (ascent light beam) sent to the end of the optical fiber and the wavelength $\lambda_1$ of the optical signal (decent light beam) received from the end of the optical fiber satisfy the following expressions (4) and (5), or (6) and (7).

$$1260 \text{ nm} \leq \lambda_0 \leq 1360 \text{ nm} \quad (4)$$

$$1480 \text{ nm} \leq \lambda_1 \leq 1580 \text{ nm} \quad (5)$$

$$1480 \text{ nm} \leq \lambda_0 \leq 1580 \text{ nm} \quad (6)$$

$$1260 \text{ nm} \leq \lambda_1 \leq 1360 \text{ nm} \quad (7)$$

EFFECT OF THE INVENTION

According to the diffractive optical element of the present invention, the diffraction angle can be maintained and the diffraction efficiency can be increased. Further, according to the optical communication module of the present invention, high module performance can be realized, and the downsizing of the optical communication module and the improvement of the light receiving performance can be realized.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by the like reference number throughout the several drawings.

DESCRIPTION OF THE PREFERRED EMBODIMENT

The best mode to conduct the present invention will be described below by using the drawings.

The First Embodiment

Figure 1:
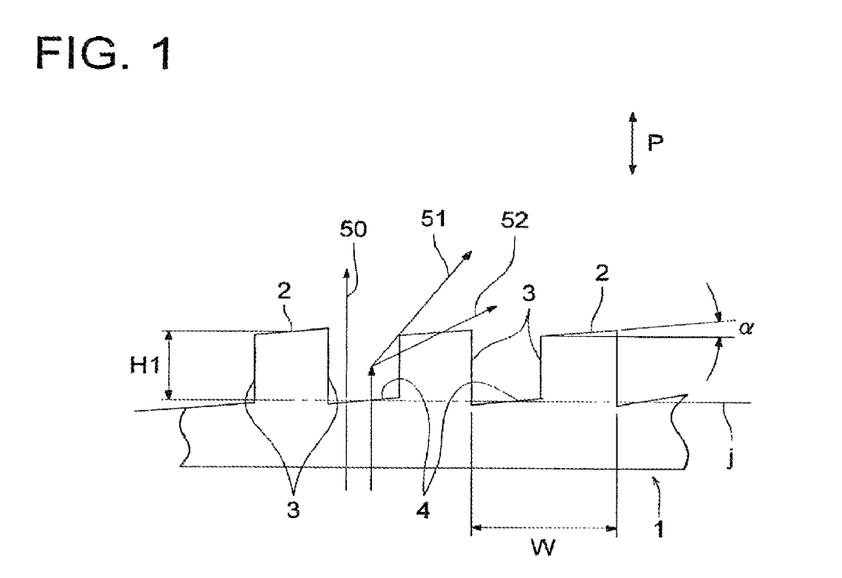
FIG. 1 is a partial side view showing main parts of the diffractive optical element according to the first embodiment.
Figure 2:
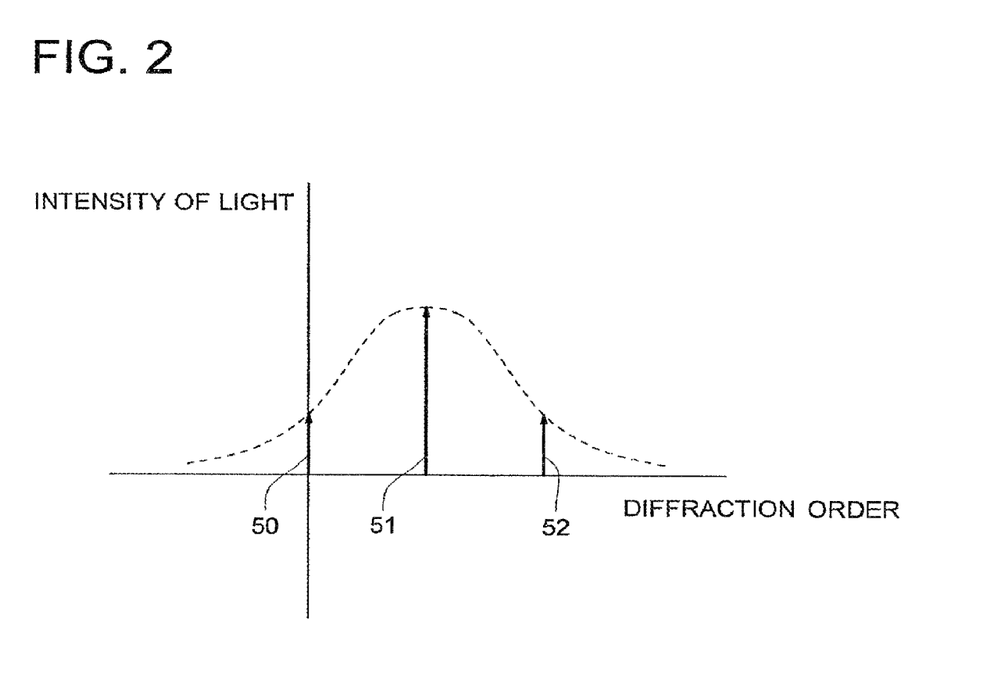
FIG. 2 is views generally showing each of intensity of lights of the 0-order diffracted light beam, +1-order diffracted light beam, and +2-order diffracted light beam in the diffractive optical element in FIG. 1.

FIG. 1 is a partial side view showing main parts of the diffractive optical element according to the first embodiment. FIG. 2 is a view generally showing the intensity of light of each of the 0-order diffracted light beam, +1-order diffracted light beam, and +2-order diffracted light beam.

As shown in FIG. 1, the diffractive optical element according to the first embodiment is composed of the diffraction grating of the concave and convex shape by which different wavelengths are demultiplexed. The diffraction grating is formed into a shape whose same shape in which the diffraction surface top part 2 on the convex side and the diffraction surface bottom part 4 on the concave side repeat through the rising surface part 3 along the optical axis direction P is continued. That is, the diffraction grating is formed into a structure of the binary shape of so-called 2-level. The diffractive optical element 1 is composed of the optical material such as the glass or plastic, and is a transmission type through which the incident light beam transmits. In FIG. 17 the case where the light beam is incident from the lower side plane of the diffractive optical element 1, is shown, however, it may also be a case where the light beam is incident from the diffraction grating side above FIG. 1 which is an opposite side. Hereupon, the reflection prevention film may also be provided on the diffraction surface top part 2 and the diffraction surface bottom part 4, and it can contribute to the increase of the diffraction efficiency.

The diffraction surface top part 2 and the diffraction surface bottom part 4 are inclined to the direction perpendicular to the rising surface part 3, and it is desirable that the inclination angle α to the reference line j in the direction perpendicular to the rising surface part 3 of the diffraction surface top part 2 and the diffraction surface bottom part 4 is 2° to 7°, preferably, within the range of 3° to 6°. When the inclination angle α is made 2° to 7°, preferably 3° to 6°, the refractive angle of the light beam in the diffraction surface top part 2 and the diffraction surface bottom part 4 can be close to the diffraction angle, and the increase of the intensity of light of the diffracted light beam can be intended. Further, when the refractive index of the material composing the diffraction grating, is n, it is desirable that the inclination angle α is made a value in which a desired diffraction angle is divided by n−1.

Figure 3:
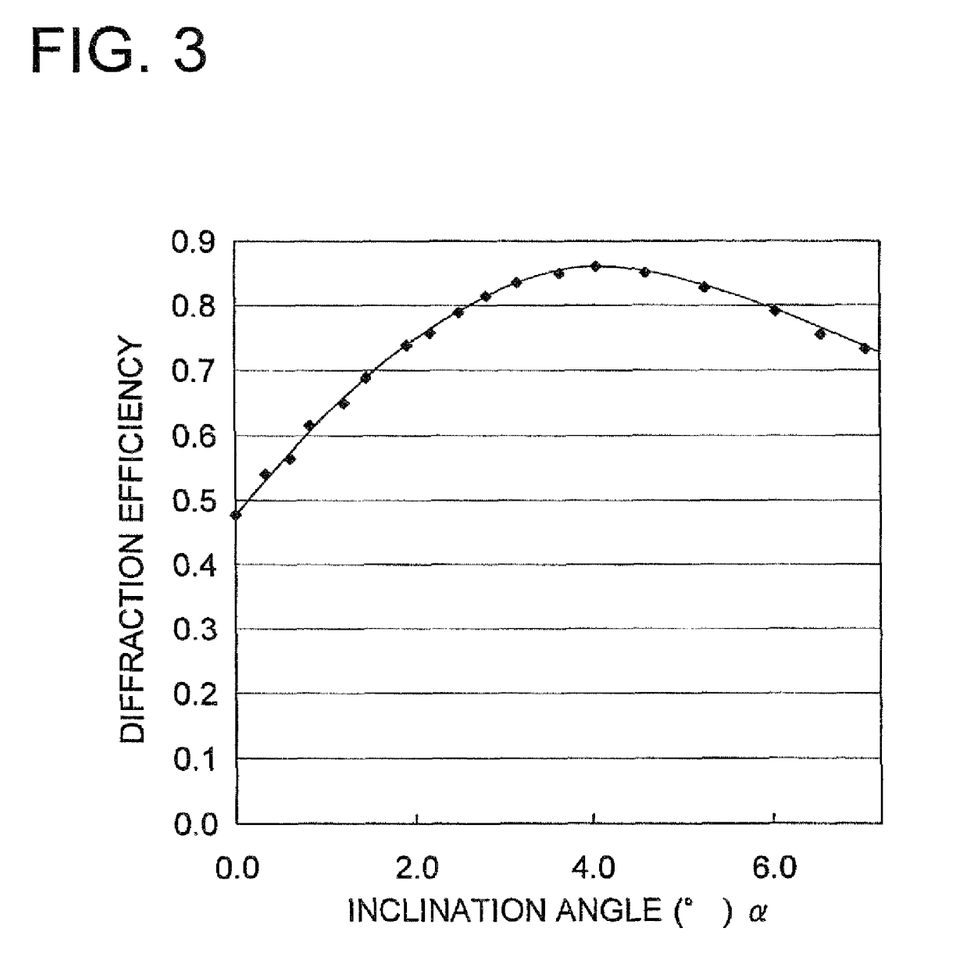
FIG. 3 is a graph showing the dependability to the inclination angle α of the diffraction efficiency in the diffractive optical element in FIG. 1 (wavelength: 1500 nm)

FIG. 3 is a graph showing the dependability to the inclination angle α of the diffraction efficiency in the diffractive optical element in FIG. 1 (wavelength: 1500 nm). When, from FIG. 3, the inclination angle α is within the range of 2° to 7°, it is seen that the diffraction efficiency becomes more than 0.7. Further, when the inclination angle α is within the range of 3° to 6°, the diffraction efficiency further becomes large, and the diffraction efficiency more than 0.8 can be obtained.

Further, it is preferable that the distance (height H1) in the optical axis direction P between a middle point of the diffraction surface top part 2 and a middle point of the diffraction surface bottom part 4 is determined so that it satisfies the following expression (8).

$$H1=(\lambda 0/(n-1))\times K \quad (8)$$

Where, λ0: the wavelength of the 0-order diffracted light beam, n: the refractive index of the material of the diffractive optical element, K: 3 or 4.

The condition of the above expression (8) is a condition in which the phase difference of the wave-front from the diffraction grating surface of a different step of the diffraction surface top part 2 in FIG. 1, and the diffraction surface bottom part 4 is 3 times or 4 times of 2π, and in this case, the 1-order light beam whose wavelength is 1.10-1.2 times (or 1/1.10-1.2 times) of the 0-order diffracted light beam is phase-aligned in the diffraction direction, and strengthens together.

The diffractive optical element 1 in FIG. 1 can be manufactured by molding by using PAMA (poly-methyl methacrylate), PC (poly-carbonate) or thermoplastic poly-imide resin, further, may be manufactured by glass.

In the diffractive optical element 1 in FIG. 1, the light beam incident in the optical axis direction P from the lower direction of the drawing becomes the 0-order diffracted light beam (transmission light beam) 50, and transmits it, and the diffracted light beam is generated, and in those diffracted light beams, the +1-order diffracted light beam 51 is diffracted and bent by a predetermined diffraction angle, further, the +2-order diffracted light beam 52 is diffracted and bent.

As show in FIG. 2, in each intensity of light of the 0-order diffracted light beam (transmission light beam) 50, +1-order diffracted light beam 51 and +2-order diffracted light beam 52, that of the 0-order diffracted light beam 50 and +2-order diffracted light beam 52 are low, and +1-order diffracted light beam 51 is largest.

Generally, when a pitch of the diffraction grating is w, a wavelength of light is λ, a diffraction angle is α, and N is the diffraction order, the following relational expression (9) is established.

$$\sin \alpha = N\cdot\lambda/w \quad (9)$$

Where, n=±1, ±2, ±3, . . . .

In the case where the diffraction 0-order light beam has the maximum intensity of light in the conventional diffraction grating 100 in FIG. 7, as in FIG. 8, when the peak angle is shifted by the diffractive optical element 1 in FIG. 1, and as in FIG. 2, when +1-order diffracted light beam 51 is shifted so that it has the maximum intensity of light, the 1-order diffraction efficiency can be improved.

As described above, according to the transmission type diffractive optical element 1 of the present embodiment, when the diffraction surface top part 2 on the convex side and the diffraction surface bottom part 4 on the concave side are inclined to the direction perpendicular to the rising surface part 3, the diffraction angle is maintained largely, and the diffraction efficiency can be made large. Further, the inclination angle α of the diffraction surface top part 2 and the diffraction surface bottom part 4 is made within the range of 2° to 7° (preferably, 3° to 6°), the diffraction efficiency can be further increased. Further, because the diffraction angle can be maintained large, the angle at which the light beam is separated into the 0-order diffracted light beam and the 1-order diffracted light beam becomes large. Further, the diffraction grating of the diffractive optical element 1 is basically 2-level binary structure, and because the structure as the diffraction grating is simple, a mold for the diffractive optical element can be made easily. Furthermore the moldability and the die releasing property are good. So the manufacturing cost of the diffractive optical element can be reduced.

The Second Embodiment

Figure 4:
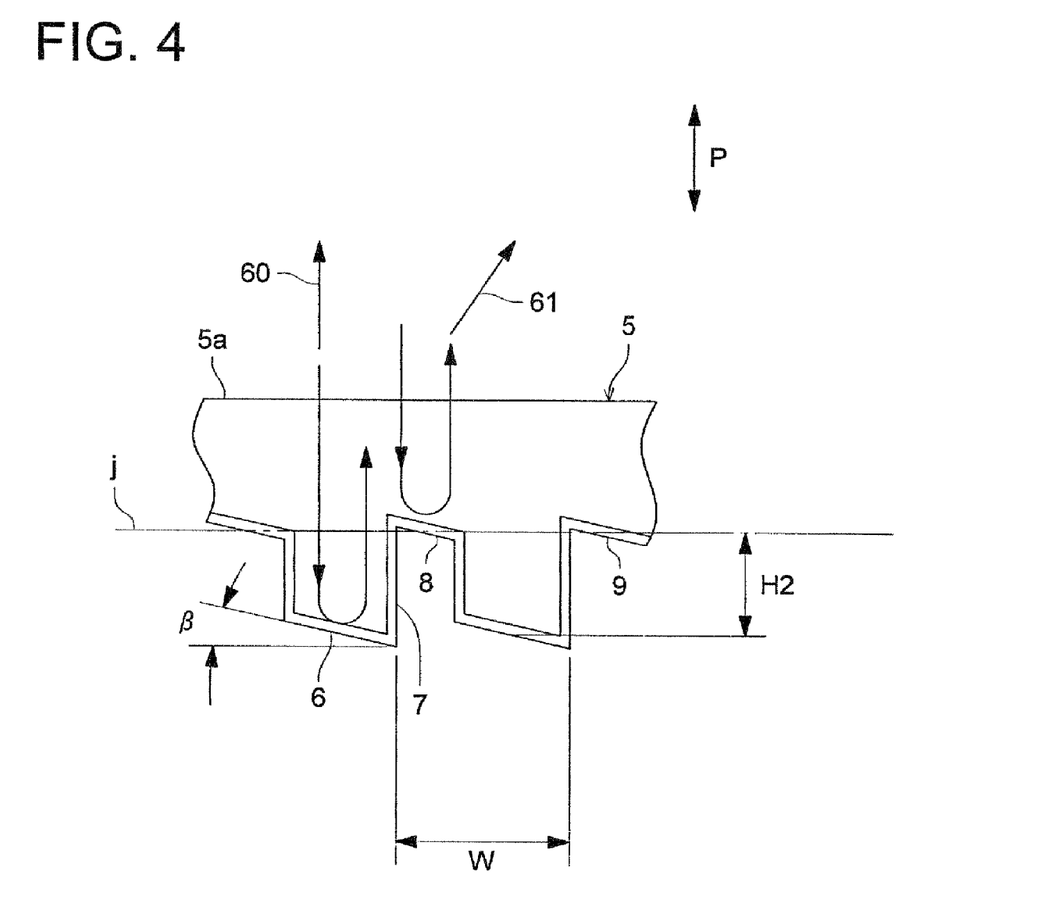
FIG. 4 is a partial side view showing main parts of the diffractive optical element according to the second embodiment.
Figure 5:
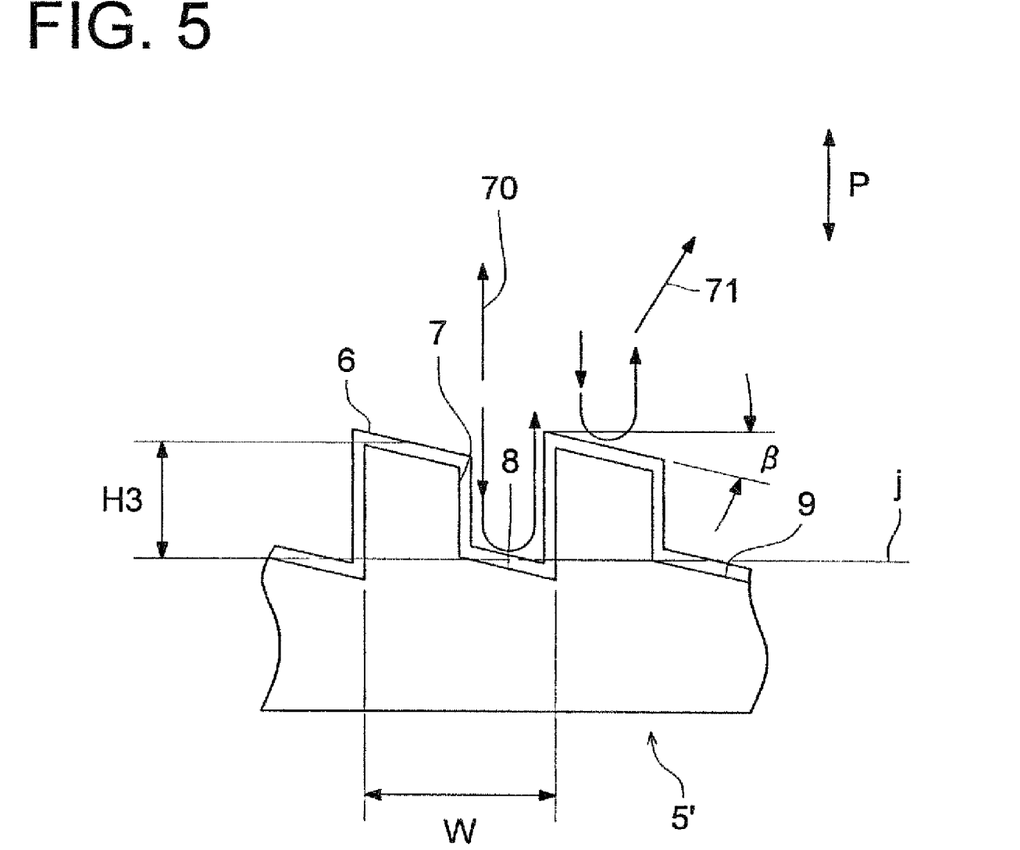
FIG. 5 is a partial side view showing main parts of another diffractive optical element according to the second embodiment.

FIG. 4 is a partial side view showing main parts of the diffractive optical element according to the second embodiment. FIG. 5 is a partial side view showing main parts of another diffractive optical element according to the second embodiment.

As shown in FIG. 4 and FIG. 5, the diffractive optical elements 5, 5' according to the second embodiment are reflection type in which the incident light beam is reflected, and is structured by the concave and convex shape diffraction grating by which the different wavelengths are demultiplexed, and the diffraction grating is formed into the same shape in which the diffraction surface top part 6 on the convex side and the diffraction surface bottom part 8 are repeated through the rising surface part 7 along the optical axis direction P. The diffraction surface grating side is formed into a reflection surface 9 formed of the high reflective surface onto which, for example, metals such as Ag, Al, Au, are evaporated.

The diffraction surface top part 6 and the diffraction surface bottom part 8 are inclined to the direction perpendicular to the rising surface part 7, and it is desirable that the inclination angle β to the reference line j in the direction perpendicular to the rising surface part 7 of the diffraction surface top part 6 and the diffraction surface bottom part 8 is within the range of 1° to 3°. When the inclination angle β is 1° to 3°, the increase of the intensity of light of the diffracted light beam can be intended. Because the reflection angle is 2 times of the inclination angle β, when the inclination angle β is made about a half of a desired diffraction angle, the diffraction angle and the reflection angle can be almost coincident, and the intensity of light of the diffracted light beam can be increased.

The diffractive optical element 5 in FIG. 4 is formed of glass or plastic, and the light beam is incident from the surface 5a side and reflected on the reflection surface 9 of the diffraction grating of the opposite side, and the 0-order diffracted light beam 60 and the 1-order diffracted light beam 61 are generated as shown in the drawing, and the 1-order diffracted light beam 61 is bent to the optical axis P.

Further, it is preferable that the distance (height H2) in the optical axis direction P between a middle point of the diffraction surface top part 6 and a middle point of the diffraction surface bottom part 8 is determined so that it satisfies the following expression (10).

$$H2=\{\lambda_0/(2\cdot n)\}\times K \qquad (10)$$

Where, $\lambda_0$: the wavelength of the 0-order diffracted light beam, n: the refractive index of the material of the diffractive optical element, K: 3 or 4.

In the diffractive optical element 5 in FIG. 5, the light beam is directly incident on the reflection surface 9 of the diffraction grating and reflected, and the 0-order diffracted light beam 70 and the 1-order diffracted light beam 71 are generated as in the drawing, and the 1-order diffracted light beam 71 is bent to the optical axis P. The diffractive optical element 5 in FIG. 5 may be formed of the optical material such as glass or plastic, however, it may not also be penetrating, and may also be formed of engineering plastic.

Further, in FIG. 5, it is preferable that the distance (height H3) in the optical axis direction P between a middle point of the diffraction surface top part 6 and a middle point of the diffraction surface bottom part 8 is determined so that it satisfies the following expression (11).

$$H3=(\lambda_0/2)\times K \qquad (11)$$

Where, $\lambda_0$: the wavelength of the 0-order diffracted light beam, K: 3 or 4.

The condition of the above expressions (10), (11) is a condition in which the phase difference of the wave-front from the diffraction grating surface of a different step of the diffraction surface top part 6 in FIG. 4, FIG. 5, and the diffraction surface bottom part 8 is 3 times or 4 times of 2π, and in this case, the 1-order light beam whose wavelength is 1.10-1.2 times (or 1/1.10-1.2 times) of the 0-order diffracted light beam $\lambda_0$ is phase-aligned in the diffraction direction, and strengthens together.

As described above, according to the reflection type diffractive optical element 5, 5' of the present embodiment, when the diffraction surface top part 6 on the convex side and the diffraction surface bottom part 8 on the concave side are inclined to the rising surface part 7, the diffraction angle is maintained largely, and the diffraction efficiency can be made large. Further, the inclination angle α of the diffraction surface top part 6 and the diffraction surface bottom part 8 is made within the range of 1° to 3°, the diffraction efficiency can be further increased. Further, because the diffraction angle can be maintained large, the angle at which the light beam is separated into the 0-order diffracted light beam and the 1-order diffracted light beam becomes large. Further, because the structure as the diffraction grating is simple, a mold for the diffractive optical element can be made easily. Furthermore the moldability and the die releasing property are good. So the manufacturing cost of the diffractive optical element can be reduced.

The Third Embodiment

Figure 6A:
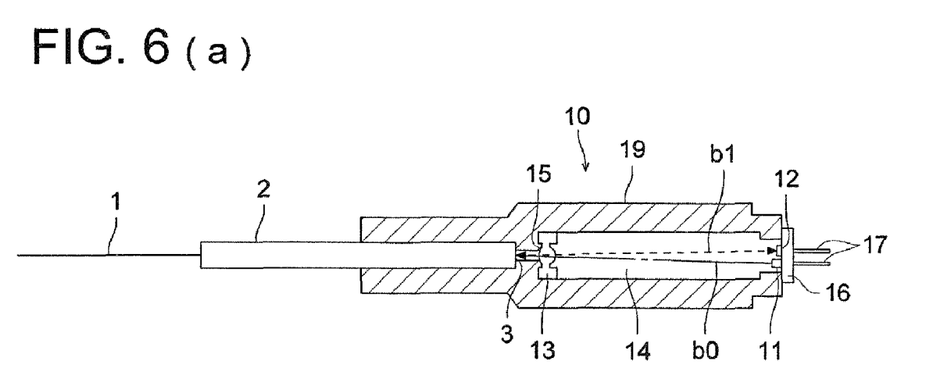
FIG. 6(a) is a main part sectional view in the longitudinal direction of the optical communication module according to the third embodiment.
Figure 6B:
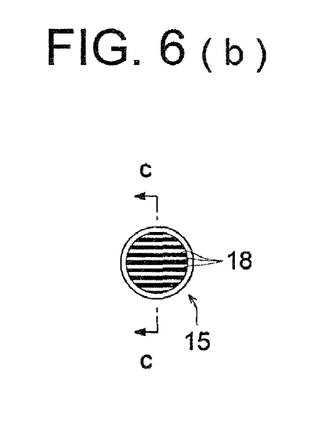
FIG. 6(b) is an enlarged plan view showing the diffraction grating formed on the surface of the coupling lens in FIG. 6(a)
Figure 6C:
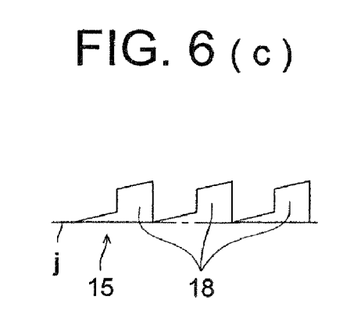
FIG. 6(c) is a general sectional view in which the diffraction grating formed on the surface of the coupling lens in FIG. 6(a) is cut in C-C line direction in FIG. 6(b), and the section viewed from the arrow-mark direction is enlarged.

FIG. 6(a) is a main part sectional view in the longitudinal direction of the optical communication module according to the third embodiment. FIG. 6(b) is an enlarged plan view showing the diffraction grating formed on the surface of a combination lens 13 in FIG. 6(a). FIG. 6(c) is a schematic sectional view in which the diffraction grating formed on the surface of a combination lens 13 is cut in C-C direction in FIG. 6(b), and its section is enlarged.

As shown in FIG. 6(a), the bidirectional optical communication module 10 is provided with: in a long and narrow almost cylindrical casing 19, the light emitting element 11; the light receiving element 12; and the combination lens 13 as the optical device. The light emitting element 11 and the light receiving element 12 are provided with a common substrate 16, and fixed to the casing together with the substrate 16. Further, a plurality of connection pins protruded outside from the substrate 16 are electrically connected.

A fiber holder 20 which supports the optical fiber 21 is inserted in the casing 19 and fixed, and the end surface 30 of the optical fiber 21 is exposed in a hollow 14 formed inside the casing 19. The optical fiber 21 is connected to the optical transmission path such as the outside optical fiber for the bidirectional optical fiber communication by the wavelength multiple method.

The coupling lens 13 is arranged in such a manner that it is opposed to the light emitting element 11 and the light receiving element 12 on the opposite side in the hollow 14 of the casing 19, and in the vicinity of the end surface 30 of the optical fiber 21.

On the optical surface on the end surface 30 of the coupling lens 13, as shown in FIG. 6(b), a stripe-like grating 15 is formed, and on the stripe-like grating 15, as shown in the sectional view of FIG. 6(c), the diffraction grating 18 in which the concave and convex diffraction surface is inclined to the reference line j, are repeatedly formed. The diffraction grating 18 is the same structure as the diffraction optical element 1.

The light beam b0 which is emitted by the light emitting element 11, transmits the coupling lens 13 and the grating 15, and is incident on the end surface 30 of the optical fiber 21 as the 0-order diffracted light beam of the wavelength $\lambda_0$ of about 1.31 μm, and can be sent to the outside light beam transmission path through the optical fiber 21.

On the one hand, the light beam from the end surface 30 of the optical fiber 21 which is transmitted from the outside, passes the grating 15 and the coupling lens 13 and diffracted by the grating 15 and bent, and becomes the 1-order diffracted light beam b1 (corresponding to +1-order diffracted light beam 51) of the wavelength $\lambda_1$ of about 1.49 μm and is incident on the light receiving element 12.

As described above, in the bidirectional optical communication module 10, as in FIG. 6(a), on the end surface 30 of the optical fiber 21, the light beam b0 and the high order (1-order or −1-order) diffracted light beam b1 are wave-combined condition, and they are demultiplexed by the grating 15 formed on the coupling lens 13. Thereby, the light beam b0 of the wavelength $\lambda_0$ advances the first optical path shown by one dot chain line in the drawing, and the 1-order diffracted light beam b1 of the wavelength $\lambda_1$ advances the second optical path in the opposite direction to the first optical path, which is shown by the dotted line in the drawing, and on the light emitting element 11 and light receiving element 12 side, respective optical paths are separated.

Hereupon, the reference line j of the diffraction grating 15 (the reference line j drawn in the sectional view in FIG. 1), is orthogonal with the center line of the casing 19 or the center line of the optical fiber 21. Further, the coupling lens 13 having the diffraction grating 15 can be manufactured of PMMA (poly-methyl methacrylate), PC (poly-carbonate), or by using the thermoplastic poly-imide resin, by the molding.

According to the bidirectional optical communication module 10 as described above, because the diffraction angle can be maintained large by the diffraction grating 18 formed on the optical surface of the coupling lens 13, a bending angle in which the second optical path of the 1-order diffracted light beam b1 is to the first optical path of the light beam (0-order diffracted light beam) b0 of the wavelength $\lambda_0$ becomes large. Therefore, the 1-order diffracted light beam b1 can be separated enough to the 0-order diffracted light beam b0, and because it is not necessary that the dimension in the optical axis direction of the casing 19 of the bidirectional optical communication module 10 is taken large, the bidirectional optical communication module 10 can be structured compactly.

Further, because the diffraction efficiency of the 1-order diffracted light beam by the diffraction grating 18 can be made large, the light beam which is transmitted from the outside and projected from the end surface 30 of the optical fiber 21 becomes the 1-order diffracted light beam b1 of the wavelength $\lambda_1$ and incident on the light receiving element 12 with the enough intensity of light, and the receiving accuracy is increased. Hereby, the stable receiving function by the bidirectional optical communication module 10 can be obtained, and the performance of the optical communication module is improved.

Hereupon, in the bidirectional optical communication module 10 in FIG. 6(a), when the 0-order diffracted light beam except of the 1-order diffracted light beam b1 generated by the diffraction grating 18 (corresponding to the 0-order diffracted light beam 50 in FIG. 1, FIG. 2) or the 2-order diffracted light beam (corresponding to the +1-order diffracted light beam 52 in FIG. 1, FIG. 2) is light-corrected by the optical fiber and guided to the light receiving element 12, the receiving accuracy may be further improved, or may also be used as the monitor light beam.

As described above, the best mode to carry out the present invention is described, however, the present invention is not limited to them, and each kind of modifications are possible in the scope of the engineering spirit of the present invention. For example, in the second embodiment, the diffraction grating which is the same as FIG. 1 is formed on the optical surface of the coupling lens 13 in FIG. 6, however, separated from the coupling lens 13, the diffractive optical element having the diffraction grating same as in FIG. 1, may also be arranged.

Further, the pitch w of the diffraction grating in diffractive optical elements 1, 5, 5' of FIG. 1, FIG. 4, FIG. 5, is not particularly limited, and can be arbitrarily set corresponding to the desired diffraction angle.

Further, in the inclination angle α in FIG. 1, and the inclination angle α in FIG. 4, FIG. 5, above-described each range is preferable, however, the setting out of the range may also be allowable at need. It is preferable when the refraction angle or reflection angle is made close to the diffraction angle by means of giving the inclination angle.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A diffractive optical element for demultiplexing light beams, comprising:
    a diffraction grating having a binary structure of repeated concave and convex shapes,
    wherein a top surface part of the convex shape, a first rising surface part, a bottom surface part of the concave shape, and a second rising surface part are repeated, in this order, consecutively,
    wherein surfaces of the first rising surface part and the second rising surface part are arranged parallel to an optical axis direction of incident light beams, and
    wherein surfaces of the top surface part and the bottom surface part are inclined by a predetermined inclination angle with respect to a direction perpendicular to the optical axis direction of the incident light beams.

2. A diffractive optical element according to claim 1, wherein the diffraction grating is structured such that an incident light beam is transmitted therethrough.

3. A diffractive optical element according to claim 2, wherein the predetermined inclination angle is within a range of 2° to 7°.

4. A diffractive optical element according to claim 3, wherein the predetermined inclination angle is within a range of 3° to 6°.

5. A diffractive optical element according to claim 2, wherein a height H1 of the concave and convex shapes in the optical axis direction satisfies the following expression:

$$H1 = \{\lambda_0/(n-1)\} \times K$$

wherein $\lambda_0$ is one of wavelengths of the incident light beams, n is a refractive index of a material of the diffraction grating, and K is 3 or 4.

6. A diffractive optical element according to claim 1, wherein the diffraction grating is structured such that an incident light beam is reflected.

7. A diffractive optical element according to claim 6, wherein the inclination angle in which the surfaces of the top surface part and the bottom surface part are to the direction perpendicular to the optical axis direction of the incident light beams is within a range of 1° to 3°.

8. A diffractive optical element according to claim 7, wherein a height H2 of the concave and convex shapes in the optical axis direction satisfies the following expression:

$$H2 = \{\lambda_0/(2n)\} \times K$$

wherein $\lambda_0$ is one of wavelengths of the incident light beams, n is a refractive index of a material of the diffraction grating, and K is 3 or 4.

9. A diffractive optical element according to claim 7, wherein a height H3 of the concave and convex shapes in the optical axis direction satisfies the following expression:

$$H3 = (\lambda_0/2) \times K$$

wherein $\lambda_0$ is one of wavelengths of the incident light beams, and K is 3 or 4.

10. An optical communication module comprising:
    a diffractive optical element for demultiplexing light beams,
    wherein the diffractive optical element comprises:
        a diffraction grating having a binary structure of repeated concave and convex shapes, wherein a top surface part of the convex shape, a first rising surface part, a bottom surface part of the concave shape, and a second rising surface part are repeated, in this order, consecutively, wherein surfaces of the first rising surface part and the second rising surface part are arranged parallel to an optical axis direction of incident light beams, and wherein surfaces of the top surface part and the bottom surface part are inclined by a predetermined inclination angle with respect to a direction perpendicular to the optical axis direction of the incident light beams.

11. The optical communication module according to claim 10, further comprising:

a light emitting element which sends an optical signal to an end of an optical fiber; and a light receiving element which receives the optical signal from the end of the optical fiber, wherein the diffractive optical element separates a first optical path between the end of the optical fiber and the light emitting element and a second optical path between the end of the optical fiber and the light receiving element.

12. The optical communication module according to claim 11, wherein the diffraction grating is structured such that an incident light beam is transmitted.

13. The optical communication module according to claim 12, wherein the predetermined inclination angle is within a range of 2° to 7°.

14. The optical communication module according to claim 13, wherein the predetermined inclination angle is within a range of 3° to 6°.

15. The optical communication module according to claim 11, wherein the height H1 in the optical axis direction of the concave and convex shape satisfies the following expression:

$$H1 = \{\lambda_0/(n-1)\} \times K$$

wherein $\lambda_0$ is one of wavelengths of the incident light beams, n is a refractive index of a material of the diffraction grating, and K is 3 or 4.

16. The optical communication module according to claim 11, wherein a wavelength $\lambda_0$ of the optical signal sent from the light emitting element to the end of the optical fiber and a wavelength $\lambda_1$ of the optical signal received from the end of the optical fiber satisfy the following expression:

$$1260 \text{ nm} \leq \lambda_0 \leq 1360 \text{ nm, and}$$

$$1480 \text{ nm} \leq \lambda_1 \leq 1580 \text{ nm.}$$

17. The optical communication module according to claim 11, wherein a wavelength $\lambda_0$ of the optical signal sent from the light emitting element to the end of the optical fiber and a wavelength $\lambda_1$ of the optical signal received from the end of the optical fiber satisfy the following expression:

$$1480 \text{ nm} \leq \lambda_0 \leq 1580 \text{ nm, and}$$

$$1260 \text{ nm} \leq \lambda_1 \leq 1360 \text{ nm.}$$

* * * * *